(12) United States Patent
Mita et al.

(10) Patent No.: US 6,596,355 B1
(45) Date of Patent: Jul. 22, 2003

(54) SEALABLE PACKAGE FOR HEATING IN A MICROWAVE OVEN

(75) Inventors: Kozo Mita, Tokyo-to (JP); Atsuko Takahagi, Tokyo-to (JP); Hirotaka Tsuchiya, Tokyo-to (JP); Kazunori Shigeta, Yokohama (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 104 days.

(21) Appl. No.: 09/598,358

(22) Filed: Jun. 21, 2000

(30) Foreign Application Priority Data

Apr. 6, 2000 (JP) .................................. 2000-104674
Apr. 24, 2000 (JP) .................................. 2000-122473

(51) Int. Cl.⁷ ............................................... B32B 27/08
(52) U.S. Cl. .................... 428/35.2; 428/35.4; 428/35.5; 428/35.7; 428/36.7; 428/346; 428/483
(58) Field of Search .............................. 428/35.2, 35.4, 428/35.3, 35.7, 36.7, 346, 483

(56) References Cited

U.S. PATENT DOCUMENTS 5,427,842 A * 6/1995 Bland et al. ................. 428/213
5,882,749 A * 3/1999 Jones et al. ................. 428/35.2

* cited by examiner

*Primary Examiner*—Sandra M. Nolan
(74) *Attorney, Agent, or Firm*—Ladas & Parry (57) ABSTRACT

A packaging material is composed of a heat resistant base layer, a sealant layer, and a resin layer disposed at least a portion between the heat-resistant base layer and the sealant layer. The resin layer is composed of a resin material having a predetermined strength in a non-heated temperature state of less than a room temperature and this strength is lowered in a high temperature state heated, for example, by a microwave oven. Such packaging material can be effectively utilized for many kinds of packaging bags or containers with the sealant layer being disposed to the inner content side of the bag or container.

24 Claims, 5 Drawing Sheets

SEALABLE PACKAGE FOR HEATING IN A MICROWAVE OVEN

BACKGROUND OF THE INVENTION

The present invention relates to packaging materials particularly usable in a high temperature atmosphere or environment such as in a state heated by a microwave oven (electronic oven) and also relates to packaging bags or containers formed of such packaging materials capable of automatically reducing inner pressure of the packaging bags and containers and preventing them from being broken or burst when they are heated by the microwave oven or like in contents filling-up condition.

Usually, frozen food and chilled food are frozen in a state contained and hermetically sealed in a packaging bag manufactured by a packaging material of plastic and a container having a cover member, covering a body (tray) of the container, which is formed of such packaging material. Further, it is to be noted that such packaging bags and containers may be called hereinlater totally as packaging bag or like for the sake of convenience. Such foods packaged are then conveyed and stored in the frozen state, and when used, the frozen food or chilled food is heated and cooked by means of microwave oven through a heating process. However, at a time when such packaged food is heated in the microwave oven, there is a fear of increasing an inner pressure of the sealed bag or package due to the expansion of inner air or steam generated from the contained food, breaking or bursting the bag or package with a large bursting voice and splashing the contained food, being dangerous and providing an inconvenient problem.

Incidentally, in a box lunch, daily dish, frozen food, chilled food and like, which are called as "box lunch" totally, herein, piece of dried bonito, fish flour, pepper, green laver, powdered cheese, mayonnaise, or like, which will be totally called as seasoning, is usually appended or added when the box lunch is sold in convenience stores, supermarkets or like. Such lunch box is heated and cooked by the microwave oven, for example, when eaten, and in such time, when the seasonings which are packaged in small packaging bags or like are heated together with the box lunch, there is a fear of swelling or expanding an air, steam or like in the small packaging bags, increasing an inner pressure of the bag and then breaking or bursting the bags with large bursting noise, the seasonings being splashed or scattered.

In order to obviate such problem, in the prior art, only the box lunch is heated by the microwave oven, for example, after taking out the small bag, pack or package, or the small bag is pierced before the heating to prevent the increasing an inner pressure of the packaging bag. However, it is inconvenient to previously take out the small bag or package from the box lunch or to pierce the same, also providing a troublesome problem and being inconvenient.

In order to obviate such inconveniences or problems, in the prior art, Japanese Patent Laid-open Publication No. HEI 9-40030 discloses a packaging container in which perforations as through holes for degassing or venting an inner gas in a plastic container are formed along a peeling (releasing) agent applied along a seal surface of the container due to the increasing of the inner pressure at the time of heating the container. Furthermore, Japanese Patent Laid-open Publication No. HEI 9-272180 discloses a package container in which such perforations as those in the above publication are formed on the seal surface along the peeling (releasing) agent applied between a heat-resistant thermoplastic resin layer and a sealant film. Such perforations are formed (occur) through the peeling of the sealed portion which has been sealed through the peeling agent layer by the increasing of the inner pressure in the container due to the heating in the microwave oven, for example. That is, through the peeling or releasing of the peeling agent layer of the sealed layer portion, the strength of the sealed portion is weakened, and as a result, the sealed portion is peeled along the released portion, and accordingly, the perforations (through holes) are formed to the container.

Furthermore, another prior art discloses a use of unwoven cloth as packaging material for preventing the package made of the unwoven cloth material from being burst such as disclosed in Japanese Patent Laid-open Publication No. HEI 9-249267, or further prior art discloses a formation of an unsealed portion for suppressing an increasing of an inner pressure of the container such as disclosed in Japanese Patent Laid-open Publication No. HEI 11-178713. Further, for example, Japanese Patent Laid-open Publication No. HEI 5-49462 discloses previous formation of small holes. All such prior art references teach the technique for previously forming the degassing holes to prevent the packages, bags or packs from being burst without providing a sealed condition of the package or container.

However, since the peeling (releasing) agent layers mentioned above are formed essentially to be easily peelable, there is a fear that such peeling agent layers are easily peeled by a pressure or impact applied in a usual transporting or storing time. Moreover, in the case of sealing the container or packaging bag by coating the peeling agent to the inner surface thereof, there is a fear of the peeling agent being contacted to the inner content by being easily bled from the sealed portion, thus being inconvenient. Because of such reasons, in the conventional art, it is necessary to take care of suitably forming the pattern shape of the peeling agent layer or to form the same so as not to be bled from the sealed portion. Therefore, there are provided some complicated matters in manufacturing processes or like.

Further, in the structure of forming the degassing holes, since the package or container is not in a sealed state, there is a fear that the inner content of the container or the seasonings in the small pack or package may be deteriorated through the contact to oxygen, steam or like during the transporting, selling or like process, which provides a significant problem.

SUMMARY OF THE INVENTION

An object of the present invention is to substantially eliminate defects or drawbacks encountered in the prior art mentioned above and to provide a packaging material particularly suitable for a packaging bag or a container usable in an atmosphere heated by, for example, a microwave oven and also provide a packaging bag or container formed of such packaging material, which is capable of being easily treated to be manufactured, being not peelable during usual transporting or storing time by any pressure or impact applied thereto and being heated safely in the microwave oven or like with an inner content being packaged therein.

This and other object can be achieved according to the present invention by providing, in a first aspect, a packaging material comprising:

a heat resistant base layer;

a sealant layer; and a resin layer disposed at least a portion between the heat resistant base layer and the sealant layer, the resin layer being composed of a resin material having a predetermined strength in a non-heated state of less than a room temperature and the strength is lowered in a heated state.

Further, according to a second aspect of the present invention, there is provided a packaging bag formed of a packaging material having a predetermined portion to be sealed, the packaging material comprising a sealant layer facing inside when a packaging bag is formed, a heat-resistant base layer and a resin layer disposed at least a portion between the heat-resistant base layer and the sealant layer, the resin layer being composed of a resin material having a predetermined strength in a non-heated state of less than a room temperature and the strength is lowered in a heated state, wherein the resin layer is formed so that the sealed portion has at least a portion which transverses from an inside portion towards an outside portion of the packaging bag.

Furthermore, according to a third aspect of the present invention, there is also provided a container having a container body and a container lid to be applied to the container body and formed of a packaging material and having a predetermined portion to be sealed, wherein the packaging material comprises a sealant layer disposed so as to face the container body when the container lid is applied to the container body, a heat-resistant base layer and a resin layer disposed at least a portion between the heat resistant base layer and the sealant layer, the resin layer being composed of a resin material having a predetermined strength in a non-heated state of less than a room temperature and the strength is lowered in a heated state, wherein the resin layer is formed so that the sealed portion has at least a portion which transverses from an inside portion towards an outside portion of the packaging bag.

According to the various aspect of the present invention of the characters mentioned above, when a packaging bag or container formed as food packaging bag or food containing container by using the packaging material of the present invention in the above first aspect and when such packaging bag or container is heated, portions of the resin layer and the sealant layer are broken because the strength of the resin layer of the packaging material is lowered when heated. As a result, the inner pressure of the packaging bag or container is reduced without splashing the inner content through the breaking, and furthermore, the resin layer disposed between the heat-resistant layer and the sealant layer does not directly contact the inner content. Accordingly, in a case where the resin layer is formed in pattern, it is not necessary to so severely control the pattern forming performance and the pattern can be easily formed, preferably, on the entire surface thereof Furthermore, according to the packaging bag and the container of the second and third aspects of the present invention, it is necessary for the seal portion of the packaging bag and the container formed of the packaging material of the first aspect to have the resin layer so as to transverse (intersect) the seal portion. This seal portion is broken or burst when heated and the inner pressure thereof is reduced. Different from conventional packaging bag or container, in those of the present invention, the forming position and the performance the resin layer are permitted at a proper extent, so that the packaging bag and the container can be easily manufactured. Furthermore, the resin layer effectively acting for reducing the inner pressure is disposed between the heat-resistant layer and the sealant layer so as not to directly contact the inner content, being advantageous. The sealing performance at a temperature less than the room temperature, such as in a frozen state is sufficient, so that the packaging bag and the container can be prevented form from being peeled or released from the seal portion during the transportation, maintenance or storage thereof, thus maintaining the preferred sealed condition.

In preferred embodiments of the above first to third aspects, it is preferred that the resin layer has a softening point in a range of 60° C. to 90° C. and is selected from one of ethylene-vinyl acetate group copolymer resin, polyamide-nitrocellulose-polyethylene wax group resin and resin composition including polyamide-nitrocellulose-polyethylene wax group resin.

In the above first and second aspect, it is preferred that a pair of the packaging materials are overlapped and heat-sealed so that the sealant layers face each other, a sealing strength of a region formed with the resin layer is to be more than 7 (N/15 mm) at a temperature less than a room temperature and to be less than 3 (N/15 mm) at a temperature more than 80° C.

Furthermore, in the above first to third aspects, it is preferred that the sealant layer is a single-layered sealant layer or multi-layered sealant layer selected from groups consisting of low-density polyethylene film, ultra-low-density polyethylene film, straight-chained low-density polyethylene film, intermediate-density polyethylene film, high-density polyethylene film, non-oriented polypropylene film, ethylene-vinyl acetate copolymer film, ethylene-acrylic acid copolymer film, ethylene-methacrylic acid copolymer film, ethylene-methylacrylate copolymer film, ethylene-ethylacrylate copolymer film, ethylene-methylmethacrylate copolymer film, and ionomer film.

It is also preferred in the above first to third aspects that heat-resistant base layer comprises one selected from groups consisting of oriented polyethylene terephthalate film, silica-deposited polyethylene terephthalate film, alumina-deposited polyethylene terephthalate film, oriented nylon film, silica-deposited oriented nylon film, alumina-deposited oriented nylon film, oriented polypropylene film, polyvinyl alcohol-coated oriented polypropylene film, nylon 6/methaxylene diamine nylon 6 co-extrusion co-oriented film, and polypropylene/ethylene-vinyl alcohol copolymer co-extrusion co-oriented film.

Still furthermore, according to the above three aspects, it is particularly preferred that the heated state is caused through a heating of a microwave oven. That is, the packaging material, packaging bag and the container of the characters mentioned above are particularly usable for or served to the microwave oven by which to be heated.

In this particular aspect, the packaging bag is a small bag containing a seasoning appended to food to be heated by the microwave oven. The seasoning material is a non-fluid material such as a piece of dried bonito.

In the second aspect, i.e. packaging bag, of the present invention, the transversing portion of the resin layer is formed with an easily openable portion, which may comprises a projecting seal portion formed so as to project inside the packaging bag. The projecting seal portion is formed with a hole or cutout for shortening a transversing length of the resin layer to a portion of at least the packaging material having the resin layer. The easily openable portion is a portion formed to the heat-resistant base layer, in the thickness direction thereof, as cutout, half-cut, score line, emboss or like.

According to the preferred embodiments of the packaging material, packaging bag and container of the present invention, when the small packages of seasoning such as dried bonito is heated together with the box lunch by the microwave oven (electronic oven), the strength of the resin layer is lowered, and the resin layer and the sealant layer are partially broken and then opened. As a result, the inner pressure of the bag or container is reduced without scattering the seasoning in the small package or like. Further, such package has a sufficient sealing strength in an environment having a temperature less than a room temperature, i.e., in a usual environmental condition in transportation, maintenance, storage or like time thereof, so that the sealed condition can be maintained in such usual state (non-heated state), thus maintaining the quality of the inner content.

Still furthermore, the easily openable portion is formed to the resin layer transversing portion and the inner pressure in the bag or container increased in accordance with the heating of the microwave oven is concentrated on this easily openable portion, so that this easily openable portion can be selectively easily broken to be opened. As a result, the packaging bag or container is opened before the inner pressure is excessively increased, so that the pressure of steam generated through the heating from the inner content can be weakened and, hence, any bursting noise can be reduced at the opening time, as well as the swelling of the packaging bag or container can be prevented, thus being safely utilized by a user.

The nature and further characteristic features of the present invention will be made more clear from the following descriptions made with reference to the accompanying drawings.

BRIEF DESCRIPTION OF THE DRAWINGS

In the accompanying drawings:

FIG. 5 includes FIGS. 6A to 5C which are plan views showing shapes of first easily openable portions formed to the packaging bag of the present invention;

FIG. 6 includes FIGS. 6A to 6C corresponding to FIGS. 6A to 5C, which are plan views showing shapes of holes and cutouts formed to protruded seal portions of the packaging bag;

FIG. 7 includes FIGS. 7A to 7D, which are sectional views showing forming processes of holes of the example of FIG. 6B;

FIG. 8 includes FIGS. 8A and 8B, which are plan views showing shapes of second easily openable portions formed to the packaging bag of the present invention; and FIG. 9 includes FIGS. 9A and 9B, which are sectional views, respectively, showing a state that a heat-resistant resin layer of the packaging material is formed with a cutout at a portion transversing the seal portion to be sealed and a state that the seal portion is opened on the basis of a selective breakage.

DESCRIPTION OF THE PREFERRED EMBODIMENTS

The present invention will be explained hereunder more concretely.

Figure 1:
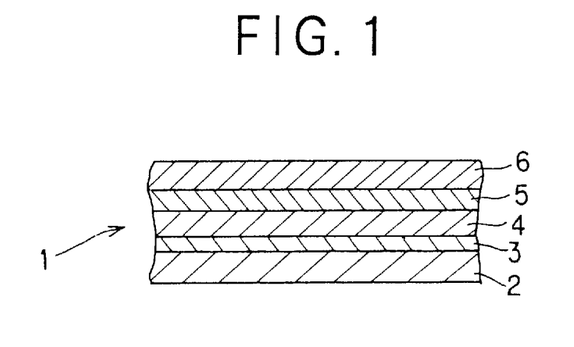
FIG. 1 is a partial sectional view showing one example of a packaging material according to the present invention.

FIG. 1 is a cross sectional view showing one embodiment of a packaging material according to the present invention, which is usable as packaging material for a packaging bag and a container (hereinafter, referred to as "packaging material 1") to be particularly served or applicable to a microwave oven or electronic oven.

As shown in FIG. 1, the packaging material 1 comprises a heat-resistant base layer 2, a printed layer 3, a resin layer 4, an adhesive layer 5 and a sealant layer 6 which are laminated in this order. In this regard, as described later, the printed layer 3 and the adhesive layer 5 are not essential layers but optional layers which are optionally provided as occasion demands. Therefore, the packaging material 1 according to the present invention and the packaging material for the packaging bag and container also of the present invention are composed of a laminated structure (body) comprising at least the heat-resistant base layer 2, the sealant layer 6 and the resin layer 4 disposed between these layers.

At least one region of the packaging material 1 between the heat-resistant base layer 2 and the sealant layer 6 is provided with the resin layer 4 which has a predetermined strength under a temperature environment with a room temperature or lower (non-heated state), while the predetermined strength is lowered under a high-temperature environment (heated state).

Further, the packaging material 1 is used for preparing the packaging bag to be served (applied) to or heated by the microwave oven by arranging the sealant layer 6 so as to be positioned inside the packaging bag and by sealing a predetermined portion to be sealed when formed as the packaging bag.

In addition, the packaging material 1 is also used for preparing a container to be served in the microwave oven by making a container lid (cover) from the packaging material 1 and arranging the container lid so that the sealant layer 6 thereof is positioned on a side of a container body and sealing a predetermined portion to be sealed.

Further, as described hereinlater, the packaging material 1 is also used for preparing:

(A) a packaging bag to be served to the microwave oven, the packaging bag being formed with a projecting sealed portion (a first easily-openable portion) which inwardly projects in the packaging bag and is formed at a portion where the resin layer 4 transverses or intersects the portion to be sealed when the predetermined portion to be sealed is actually sealed; and (B) a packaging bag to be served to the microwave oven, the packaging bag being formed with a portion (a second easily-openable portion) which is formed by providing a cut, a half-cut, perforation, score-line or emboss to a portion of the heat-resistant base layer 2 in a thickness direction thereof where the resin layer 4 transverses or intersects the sealed portion after the predetermined portion to be sealed is actually sealed.

The heat-resistant base layer 2 is an essential layer for making the packaging material 1 of the package bag or the like. When the packaging bag or the container is manufactured by using this packaging material 1, the heat-resistant base layer 2 is provided at outside i.e., an opposing side of a content in the bag or the container. In general, the material for constituting the heat-resistant base layer 2 is not particularly limited as far as the material can be used as a packaging material for packaging foods to be heated or thermally cooked by means of microwave oven.

Examples of the material for constituting the heat-resistant base layer 2 may include: oriented polyethylene terephthalate film; silica-deposited polyethylene terephthalate film; alumina-deposited polyethylene terephthalate film; oriented nylon film; silica-deposited oriented nylon film; alumina-deposited oriented nylon film; oriented polypropylene film; polyvinyl alcohol-coated oriented polypropylene film; nylon 6/methaxylene diamine nylon 6 co-extrusion co-oriented film; and polypropylene/ethylene-vinyl alcohol copolymer co-extrusion co-oriented film or the like. Any one the films described above will be available. The heat-resistant base layers 2 formed of the films mentioned above have a melting point of 150° C. or more, and preferably have a thickness of 10–50 $\mu$m, more preferably, have a thickness of 10–20 $\mu$m.

The printed layer 3 is formed by a conventionally well-known printing method for the purpose of indicating the content or imparting a fine appearance. The printed layer 3 is not an essential layer but an optional layer which is formed as occasion demands. Normally, as shown in FIG. 1, the printed layer 3 is formed at an upper surface side of the heat-resistant base layer 2 i.e., at an inner side (content side) of the heat-resistant base layer 2 when the packaging bag or the container is manufactured, or the printed layer 3 is formed at a lower surface side of the heat-resistant base layer 2 i.e., at an outer side (opposing side of the content) of the heat-resistant base layer 2 when the packaging bag or the container is manufactured.

The resin layer 4 is provided to at least one region between the heat-resistant base layer 2 and the sealant layer 6 as an essential layer. This resin layer 4 has a characteristic such that a predetermined strength can be maintained under an environment with a temperature lower than a room temperature while the strength is lowered under a high-temperature environment. In this regard, the term "at least one region" means that the resin layer 4 may be formed at an entire region or a part of region between the heat-resistant base layer 2 and the sealant layer 6.

The temperature lower than the room temperature for maintaining the predetermined strength means an environmental temperature at which the contents such as foodstuffs, seasonings, cooked food or the like are packaged by using the packaging material, or the environmental temperature at which the packaging bag and container together with foods are frozen after the contents are air-tightly packaged, or the environmental temperature at which the frozen foodstuffs and packed lunches (box lunch) or the like are distributed and sold at markets. Therefore, the resin layer 4 holds the predetermined strength under the environmental temperature (non-heated state).

On the other hand, the high temperature environment at which the predetermined strength is lowered, mentioned herein, means the temperature environment which is applied to the packaging bag or the container when the packaging bag or the container is heated or thermally cooked by the microwave oven, for example. The strength of the resin layer 4 is disadvantageously lowered under such a high temperature environment.

In the present invention, the resin layer 4 having such characteristics is provided to a predetermined portion of the packaging material 1, i.e., at least part of a predetermined portion to be sealed, the portion being formed at the time of manufacturing the packaging bag or the container so that the resin layer 4 intersects or transverses from inside to outside the packaging bag or the container. In this regard, the term "at least part" means that the resin layer 4 may be formed at entire region or a part of the portion to be sealed.

Therefore, in a case where the resin layer 4 is provided to the entire region, the resin layer 4 is necessarily formed to the entire portion to be sealed. In contrast, in a case where the resin layer 4 is provided to one region, the resin layer 4 in this region is formed so as to transverse or intersect at least part of the portion to e sealed. When the resin layer 4 formed at this portion is heated by the microwave oven to reach a high temperature, the strength of the resin layer 4 is lowered.

Figure 2:
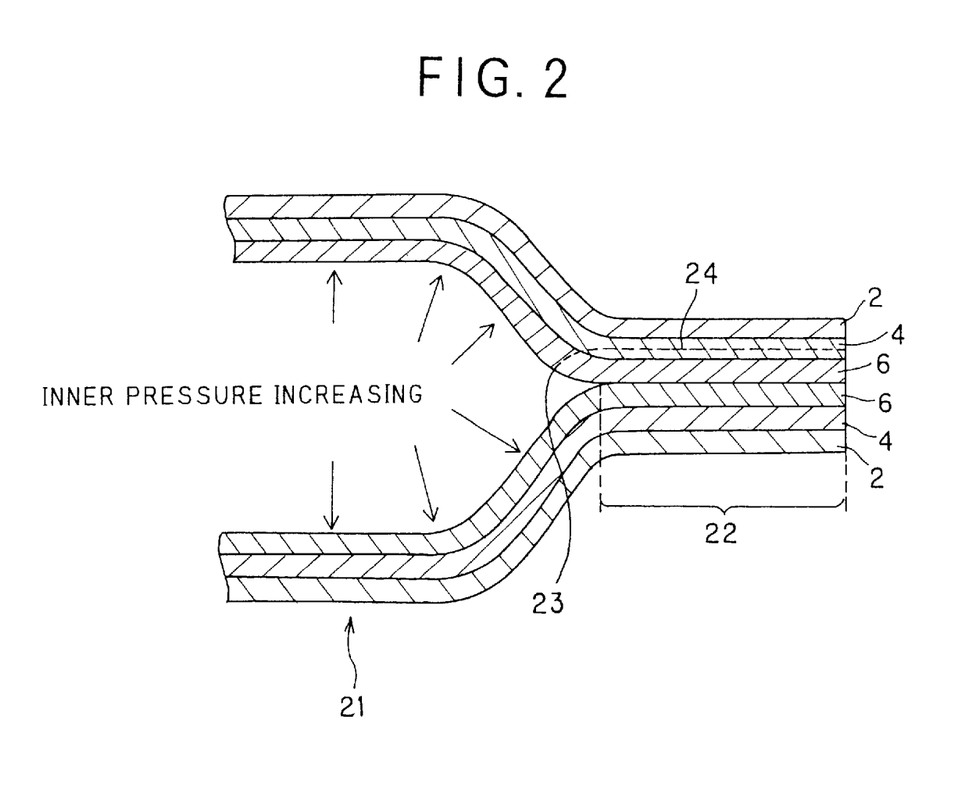
FIG. 2 is an enlarged sectional view showing a seal portion of a packaging bag formed of the material shown in FIG. 1.

As shown in FIG. 2 indicating an enlarged cross sectional view of a sealed portion 22 formed to the packaging bag 21, when the packaging bag 21 containing the content is heated by the microwave oven and air in the packaging bag is expanded or moisture contained in the content is vaporized, an inner (internal) pressure of the bag 21 is increased and the resin layer 4 having a lowered strength is broken at an arbitrary (certain) portion 23 of the sealant layer 6 close to the sealed portion 22. The breakage starts at that arbitrary portion 23 which acts as a starting point. A reference numeral 24 denotes an imaginary line along which the breakage advances.

As a result, an air-discharging (air-bleeding) with a relatively small scale will occur at a space between the sealant layer 6 of the sealed portion 22 and the heat-resistant base layer 2, the breakage of the resin layer 4 advances from inside to outside the packaging bag 21, so that water vapor and moisture or the like in the packaging bag 21 are bled, whereby the inner pressure of the bag 21 can be reduced. In the present invention, the breakage is partially caused and the scale of the air-bleeding is relatively small, so that the inner pressure of the packaging bag 21 is not abruptly lowered, whereby a splashing or scattering of the content in the bag 21 would not occur.

The above feature can be also similarly applied to a container comprising a container body (tray) and a container cover to be heat-sealed to a periphery of the container body. In the container to which the container cover using the packaging material mentioned above is heat-sealed, the partial breakage is caused by the same function as described above and the air-bleeding with a relatively small scale occurs, so that the inner pressure of the container is not abruptly lowered, whereby the splashing or scattering of the content in the container would not occur.

As a material for constituting the resin layer 4 having such properties, the following resin materials having a melting point of 60–90 C. can be used. For example, ethylene-vinyl acetate group copolymer resin, polyamide-nitrocellulose group resin, or a resin composition containing polyamide-nitrocellulose-polyethylene wax group resin or the like can be used. When the resin layer having a melting point of 60–90° C. is formed, it becomes easy to cause a partial breakage at a part of the resin layer 4 and the sealant layer 6 at the time of being heated by the microwave oven.

As a method of forming the resin layer 4, conventionally well-known resin coating methods will be available. A thickness of the resin layer 4 may preferably be set to 1–5 $\mu$m. When the thickness of the resin layer 4 is less than 1 $\mu$m, there is a disadvantage such that the breakage of the resin layer 4 and the sealant layer 6 is hard to occur at the time of being heated by the microwave oven. On the other hand, when the thickness of the resin layer 4 exceeds 5 $\mu$m, the following another disadvantage is raised in accordance with patterns of the resin layer 4. Namely, when the obtained film-shaped packaging material is wound into a roll-shape, a part of the packaging material is swelled and then the swollen portion is adversely expanded.

When a pair of the packaging materials 1 are overlapped and heat-sealed so that the sealant layers 6 are faced each other, a seal-strength of a region provided with the resin layer 4 is preferably to be 7 N/15 mm or more at a temperature range lower than the room temperature (non-heated state), while the seal-strength is preferably to be less than 3 N/15 mm at a high temperature range higher than 8020 C. (heated state). Since the seal-strength is 7 N/15 mm or more at a temperature range lower than the room temperature, the sealed portion would not be peeled off and can be maintained in a sealed condition even if the operations such as handling, storage, distribution, sales of the packages are performed under a condition of the room temperature or a freezing temperature.

On the other hand, since the seal-strength at a high temperature range higher than 80° C. is less than 3 N/15 mm, when the packaging material is heated by the microwave oven, the strength of the region provided with the resin layer 4 is lowered to a level enabling a part of the resin layer 4 and the sealant layer 6 to be broken. In the packaging bag formed of the packaging material having such property or the container formed by heat-sealing a container lid composed of the packaging material, the seal-strength can be appropriately controlled within a range of the level mentioned above. Therefore, it is also possible to control the seal-strength so that the packaging material is partially broken for the first time when the packaging bag or the container is heated by the microwave oven and the inner pressure is increased to a predetermined level. These countermeasures are particularly effective when the packaging material is used for foods such as Chinese pork dumpling which is cooked by being steamed by steam generated in the packaging bag or the container.

The sealant layer 6 as an essential layer is provided onto the resin layer 4 and constitutes the most inner layer which directly contact the content in the packaging bag or container when produced. The material for constituting the sealant layer 6 is not particularly limited as far as the material is generally used as a packaging material for packaging foods to be heated or thermally cooked by the microwave oven.

Examples of the material for constituting the sealant layer may include low-density polyethylene film, ultra-low-density polyethylene film, straight-chained low-density polyethylene film, intermediate-density polyethylene film, high-density polyethylene film, non-oriented polypropylene film, ethylene-vinyl acetate copolymer film, ethylene-acrylic acid copolymer film, ethylene-methacrylic acid copolymer film, ethylene-methylacrylate copolymer film, ethylene-ethylacrylate copolymer film, ethylene-methylmethacrylate copolymer film, ionomer film. Among these films, at least one of the films is used and can constitute a single-layered sealant layer or a multi-layered sealant layer.

A thickness of the sealant layer 6 is normally set to 20–60 $\mu$m, preferably, to 30–40 $\mu$m. In the present invention, when the packaging bag or the container is manufactured, an opposing pair of sealant layers 6 constitute a sealing surface at a portion to be sealed. As a result, a conventional sealing surface formed by providing a peeling agent layer (releasing agent layer) having a small seal-strength is not formed unlike the conventional packaging bag or the container. Therefore, an accident, such that the sealing surface sticked to each other is broken and the content is exposed outside, would not occur, whereby a deterioration in quality of the content packaged in the packaging bag or the container would not occur.

Since the strength of the resin layer 4 is lowered at the high temperature range, when the inner pressure in the air-tightly sealed packaging bag 21 or the container is increased, the sealant layer 6 is obliged to bear the inner pressure by the strength of the sealant layer 6 itself. Therefore, the sealant layer 6 formed to a portion close to a boundary surface of the sealed portion 22 provided to the inside of the packaging bag or the container becomes liable to cause a crack due to the lowering of the strength of the resin layer 4 adjacent to the sealant layer 6. Finally, the sealant layer 6 together with the resin layer 4 are broken by the inner pressure at the arbitrary portion 23 which acts as a breaking (bursting) starting point, whereby the air-bleeding starts (see FIG. 2).

Although it is not shown in the figures, for example, either one or both of an oxygen-barrier layer and a shock-absorbing resin layer may be also provided as an intermediate layer. Further, these intermediate layers may be also provided in a form of plural layers. For example, as a material for constituting the oxygen-barrier layer, vinylidene chloride film, ethylene-vinyl alcohol copolymer film, inorganic-deposited film, or the like may be available.

As a material for constituting the shock-absorbing resin layer, a nylon film is preferably used. As the nylon film, any one of stretched type, biaxially oriented type and non-oriented type films can be preferably used. Although a thickness of the shock-absorbing resin layer is not particularly limited, the thickness is normally set to a range of 5–40 $\mu$m and, more preferably, to a range of 10–30 $\mu$m. However, even in a case where the intermediate layer is provided, it is preferred to provide the resin layer 4 to the sealant layer 6 as the most inner layer or to the sealant layer 6 through another resin layer 5 from a standpoint of easy occurrence of the air-bleeding.

As far as an object to be achieved of the present invention is not obstructed, conventionally well-known additives such as lubricant, oxidation-preventing agent, antistatic agent, coloring agent or the like can be optionally added to the resin material for constituting the respective layers of the packaging material according to the present invention. The respective layers can be also bonded by using adhesive agents such as urethane adhesive agent. In this regard, as far as it would not raise any hygienic problem, any adhesive agent other than the above adhesive agent may be also used.

The packaging material 1 described above is superposed so that the respective sealant layers 6 face to each other, and a desired portion to be sealed is heat-sealed, whereby the packaging bag capable of being served to a microwave oven can be manufactured. The packaging material of the present invention can be also applied to a pillow type packaging. In this pillow packaging, air-bleeding may be caused at a back-sealed portion.

In addition, a container lid is prepared from the packaging material 1, then the container lid is provided so that the sealant layer 6 is positioned to a side of a container body and a predetermined portion to be sealed is heat-sealed, whereby the container served to a microwave oven can be also manufactured. As a method of heat-sealing, conventionally well-known methods will be available. For example, there can be utilized external heating systems using a heated bar, heated knife, heating wire or internally heating systems using an ultrasonic wave sealing and dielectric heating or the like.

Figure 3:
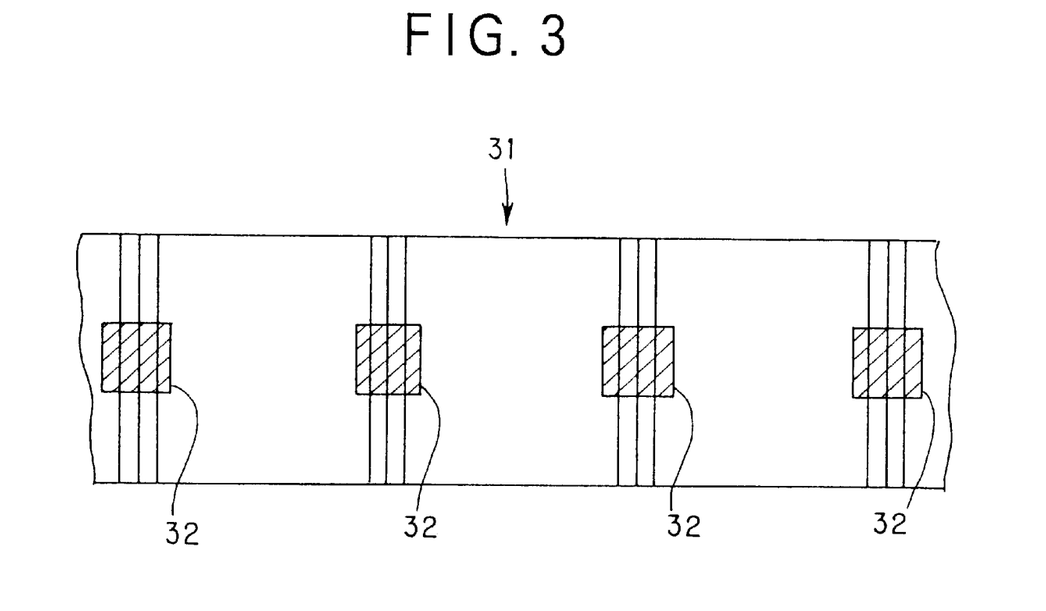
FIG. 3 is a plan view showing a raw fabric (original continuous sheet before cutting into pieces) of the packaging material of FIG. 1 on which resin layers are coated in pattern at predetermined areas.
Figure 4:
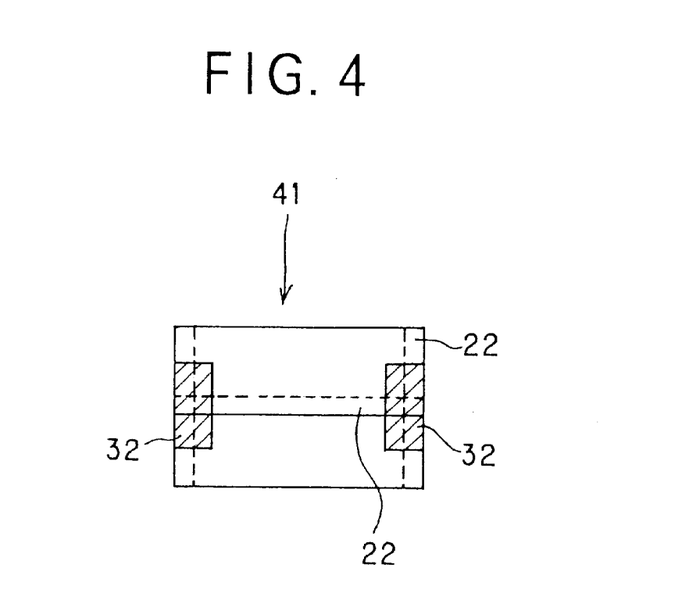
FIG. 4 is a plan view of one example of a packaging bag manufactured by using the packaging material shown in FIG. 3 particularly usable for the heating of a microwave oven.

FIG. 3 is a plan view showing a raw fabric of the packaging material 31 in which resin layer forming regions 32 are formed to predetermined regions by pattern-coating the respective resin layers 4. FIG. 4 is a plan view showing one embodiment of a packaging bag 41 according to the present invention capable of being served to the microwave oven, the packaging bag 41 being prepared by using the packaging material 31 as shown in FIG. 3. The packaging bag 41 is manufactured in such a manner that the original sheet of the packaging material 31 is folded or superposed in two-ply structure (not shown), then an outer periphery of the packaging material is heat-sealed.

The resin layer 4 mentioned hereinbefore can be formed on the entire surface of the original sheet of the packaging material 31. However, the resin layer 4 can be also formed to one region 32 through patterning operation as shown in FIG. 3. In a case where the resin layer 4 is formed by the patterning operation, it is necessary for the resin layer 4 to be formed at a position to which the resin layer 4 is formed for satisfying a condition of that the resin layer 4 intersects at least one region 32 of the sealed portion from inside to outside the packaging bag. As a result, when the packaging bag is heated by the microwave oven, a partial breakage of the resin layer 4 and the sealant layer 6 would occur at the resin layer forming region 32 and the air-bleeding is caused, whereby the pressure in the packaging bag can be reduced without splashing or scattering the inner content of the bag.

Next, a packaging bag having an easily openable portion of the present invention will be explained hereunder.

The easily openable portion includes: a first easily openable portion comprising a projecting sealed portion having a shape projecting towards inside the packaging bag at a portion where the resin layer 4 intersects the sealed portion when the predetermined portion to be sealed is heat-sealed; and a second easily openable portion formed in such a manner that the predetermined portion to be sealed is heat-sealed, then notch, half-cut, perforation, score-line or emboss is formed at a portion of the heat-resistant resin layer 2 where the resin layer 4 intersects the portion to be sealed.

The easily openable portion serves as a starting point for starting to selectively unseal or open the packaging bag when the packaging bag is heated by the microwave oven. Further, it is to be noted that the easily openable portion mentioned above means a portion which is worked so as to realize an easiness in performing the opening operation.

Figure 5A:
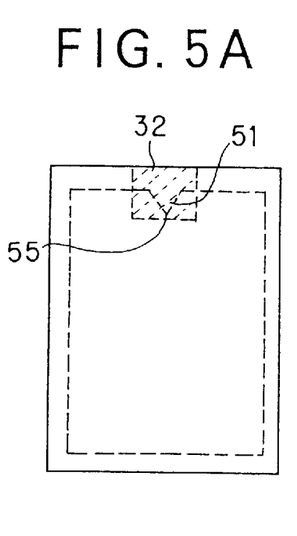
Figure 5B:
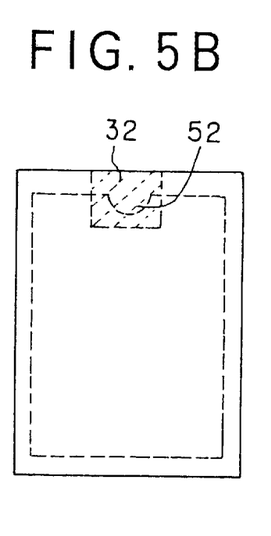
Figure 5C:
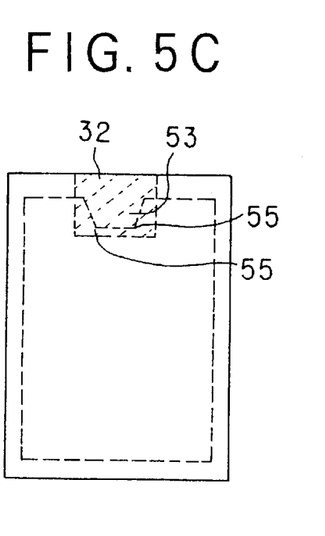

FIG. 5 is a plan view showing a shape of the first easily openable portion to be provided to the packaging bag of the present invention which is served to a microwave oven. As shown in FIGS. 5A–5C, the first easily openable portions are projecting sealed portions 51, 52 and 53 that are formed so as to project towards inside the packaging bag. For example, the projecting sealed portion is formed to have a triangular-shape (FIG. 5A), a circular arc-shape such as semi-circle (FIG. 5B), a trapezoid-shape (FIG. 5C) or a quadrangle-shape or the like.

These projecting sealed portions 51, 52 and 53 can be easily formed by appropriately modifying or selecting a shape of a heating jig when the heat-sealing operation is performed. When the packaging bag is heated by the microwave oven, the internal pressure is increased and the increased stress due to the increased internal pressure is concentrated to the projecting sealed portions 51, 52 and 53. As a result, the resin layer 4 and the sealant layer 6 of the projecting sealed portions 51, 52 and 53 are selectively broken thereby to unseal and open the packaging bag.

In this connection, by appropriately selecting the shape of the projecting sealed portion, a degree of the stress concentration to be applied to the projecting sealed portion can be appropriately controlled. For example, in a case of the projecting sealed portions having a corner portion 55 shown in FIGS. 5A and 5C, the stress due to the increased internal pressure is concentrated to the corner portion 55, so that it becomes possible to easily cause the selective breakage in comparison with the projecting sealed portion having a circular arc-shape shown in FIG. 5B.

Figure 6A:
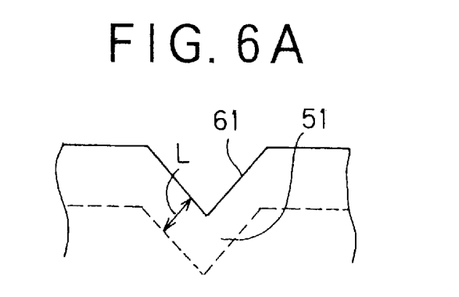
Figure 6B:
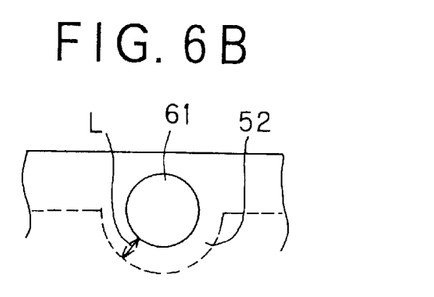
Figure 6C:
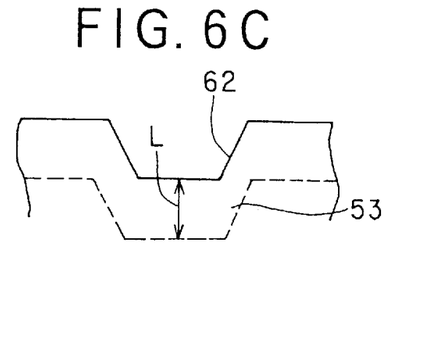

As shown in FIG. 6, it is preferred to provide a hole 61 or cutout 62 to the projecting sealed portions 51, 52 and 53 which constitute the first easily openable portion. Such hole 61 or the cutout 62 is formed for the purpose of shortening a length L of a portion through which the resin portion intersects. The length L of the resin layer 4 and the sealant layer 6 is shortened by providing the hole 61 or the cutout 62.

Figure 7A:
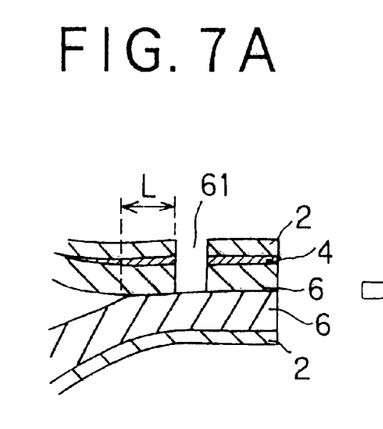
Figure 7B:
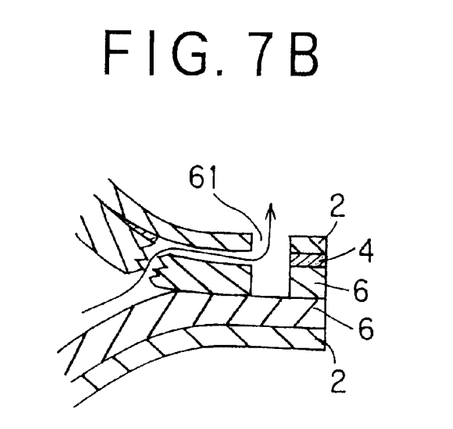
Figure 7C:
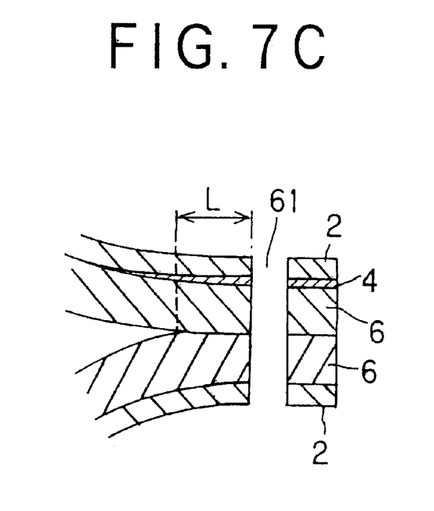
Figure 7D:
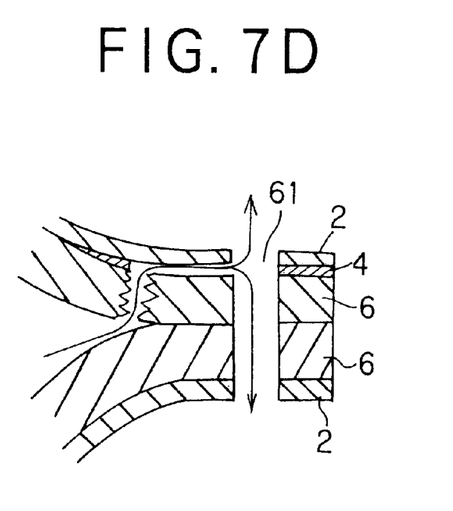

Therefore, as shown in FIGS. 7B and 7D, an unsealing operation or an opening operation for the packaging bag based on the breakage of the resin layer 4 and the sealant layer 6 can be performed easily and effectively when the projecting sealed portion of the packaging bag heated by the microwave oven is selectively broken. As a result, there can be provided effects of preventing to cause a detonation at the unsealing operation and preventing the packaging bag from being swollen.

A shape of the hole 61 or the cutout 62 is not particularly limited to the shown ones, and, however, as shown in FIG. 6, it is preferred that the hole 61 or the cutout 62 is formed so as to have a shape which imitates the shape of the projecting sealed portions 51, 52 and 53. It is also preferred that the length L of the resin portion 4 to be broken at the projecting sealed portion is set to the same length as in the respective projecting sealed portions.

As shown in FIG. 7, the hole 61 or the cutout 62 is required to be formed to at least a side of the packaging material to which the resin layer 4 is provided. However, the hole 61 or the cutout 62 may be also formed together with the packaging material to which the resin layer 4 is not provided. In this regard, in the case of the hole 61 or the cutout 62 being formed together with the packaging material to which the resin layer 4 is not provided, the hole 61 or the cutout 62 may be formed by drilling, perforating, cutting or blanking or the like after the packaging bag having the projecting sealed portion has been manufactured by the heat-sealing operation, thus being very convenient in manufacturing the products.

Figure 8A:
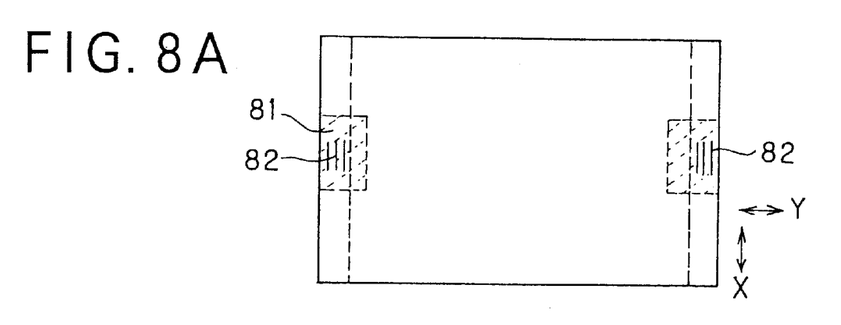
Figure 8B:
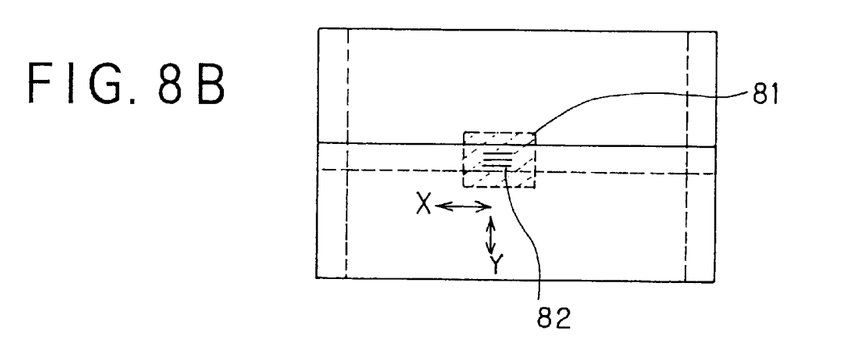
Figure 9A:
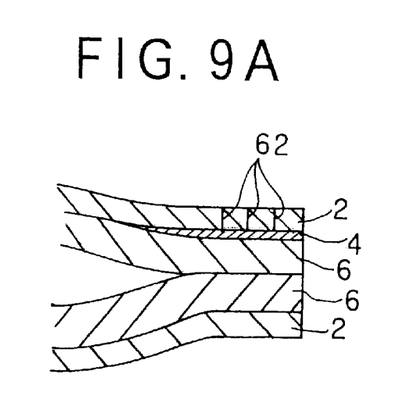
Figure 9B:
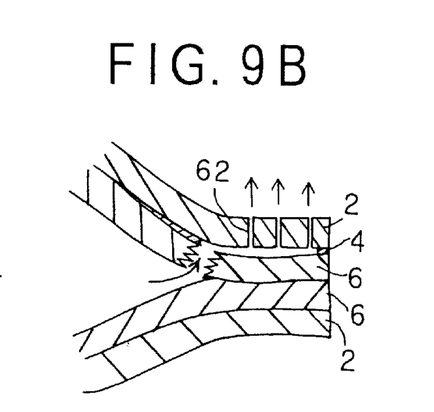

FIG. 8 is a plan view showing a shape of a second easily openable portion to be formed to a packaging bag according to the present invention which is served to a microwave oven. FIG. 9 is a cross sectional view showing a feature in which cutouts are formed to a heat-resistant resin layer at a portion where the resin layer intersects the portion to be sealed and showing a feature after the sealed portion has been unsealed and opened on the basis of the selective breakage.

As shown in FIGS. 8A and 8B, the second easily openable portion is a portion where cutouts, half-cut, perforation, score-line or emboss (hereinafter, referred to generally as "cutout or the like 82) are formed to the heat-resistant resin layer 2 in a thickness direction thereof at a portion 81 where the resin layer 81 intersects the portion to be sealed. The second easily openable portion is normally formed by sealing a predetermined portion to be sealed and working the sealed portion.

An extending direction of the cutout or the like 82 are not particularly limited as far as the cutout or the like 82 are formed in a thickness direction of the heat-resistant resin layer 2. Namely, the extending direction of the cutout or the like 82 can be set to an X-direction along the sealing direction or can be also set to a Y-direction normal to the sealing direction. As a general rule, the cutout or the like 82 is formed so as to extend in an X-direction along the sealing direction.

In addition, as shown in FIG. 9B, it is also possible to form a plurality of cutouts 62. In this connection, as shown in FIGS. 8A and 8B, the cutout or the like 82 can be provided for any portions in the heat sealed portion as far as the heat sealed portion is formed with the resin layer.

When the second easily openable portion is formed by appropriately setting a kind, extending direction, position and number of the cutout or the like 82, it becomes possible to control the easiness in unsealing or opening the packaging bag at the time when the packaging bag is heated by the microwave oven.

As a method of forming the cutout or the like 82, conventionally well-known methods is be available. For example, the cutout can be formed by means of cutting machine or a punch, the half-cut is formed by a laser machine or a cutter, the perforation or score-line is formed by a cutter, and the emboss is formed by means of an embossing role, respectively. By the action of the cutout or the like 82, the resin layer 4 and the sealant layer 6 of the sealed portion comprising the second easily openable portion can be easily and selectively broken.

The first and second easily openable portions mentioned above can be also compositely formed. That is, the first easily openable portion comprising the projection sealed portion is formed, then the cutout or the like is formed to the first easily openable portion thereby to form the second easily openable portion. The thus formed composite easily openable portion is adopted to a case where the easiness in unsealing or opening the packaging bag at the time of being heated by the microwave oven is required to be appropriately controlled.

Next, a package (small pack) to be served to the microwave oven will be explained hereunder.

The packaging bag of the present invention to be served to the microwave oven can be also applied to a package or pack for packaging a seasoning which is attached to foods to be heated by the microwave oven. The package can be formed to have substantially the same features as those of the packaging bag described above.

The kind of the seasoning is not particularly limited as far as the seasoning is one attached to a box lunch, daily dish, frozen foodstuff, chilled food or the like that are sold at a convenience store, a supermarket or the like. However, generally, the seasoning preferably is a non-fluid substance, powdery substance or semi-fluid substance. For example, as the powdery substance, finely sliced dried-bonito (chipped bonito), fish flour, red pepper, green laver, powdery cheese or the like are listed. As the semi-fluid substance, mayonnaise, dressing or the like are listed. Among them, the small packaging bag of the present invention is particularly preferable to be applied to the sliced dried-bonito (chipped bonito) and fish flour. Since the pocket to be served to the microwave oven is used to air-tightly package the above seasonings and attached to the box lunch or the like, the package is formed to have a size approximately of 10 cm×15 cm or smaller.

EMBODIMENTS

The present invention will be explained hereunder in more detail with reference to the following Examples.

EXAMPLE 1

As a heat-resistant base layer 2, a polyethylene terephthalate film having a thickness of 12 μm was prepared. Onto the heat-resistant base layer 2, ethylene-vinyl acetate copolymer resin (melting point: 66.8° C., WT-PC agent mfd. by Inktech Co. Ltd.) as a resin layer 4 was pattern-coated so as to provide a pattern shown in FIG. 3 and have a thickness of 3 μm. Thereafter, a straight chain type low-density polyethylene film as a sealant layer 6 having a thickness of 30 μm was superposed and dry-laminated to the resin layer 4 through a two-liquid hardening type polyurethane adhesive agent as an adhesive layer 5, thus manufacturing a packaging material to be served to the microwave oven. The sealing strength of the thus obtained packaging material was 23.8 (N/15 mm) at a temperature of 25° C. and 2.4 (N/15 mm) at a temperature of 90° C.

By using this packaging material and a high-speed fully-automatic pillow-packaging machine, Chinese pork dumplings packed in a tray was subjected to a transverse-pillow-packaging operation (bag size: 130 mm×240 mm) thereby to manufacture a pouch of Example 1 to be served to the microwave oven.

Thereafter, the pouch was frozen, and the thus obtained pouch containing the frozen pork dumplings was thermally cooked as it is by means of a microwave oven. When the pouch was heated to a temperature of about 100° C. and an inner (internal) pressure in the pouch was increased by steam, for example, there was caused a small crack at a portion close to the heat sealed portion provided to an inner side of the packaging bag as shown in FIG. 2, then the resin layer 4 was broken at the crack which acts as a starting point of the breakage, thus causing an air-bleeding. As a result, the steam filling in the packaging bag was discharged to lower the internal pressure. At this time, although there was caused a faint detonation, the pork dumplings as content was not scattered at all. Since the breakage of the resin layer 4 was small so as not to abruptly discharge the steam in the packaging bag, the pork dumplings after being thermally cooked had been sufficiently steamed and found to have an excellent condition in good taste.

EXAMPLE 2

As a heat-resistant base layer 2, a biaxially oriented polypropylene film having a thickness of 20 μm was prepared. Onto the heat-resistant base layer 2, ethylene-vinyl acetate copolymer resin (melting point: 66.8° C., WT-PC agent mfd. by Inktech Co. Ltd.) as a resin layer 4 was pattern-coated so as to provide a pattern shown in FIG. 3 and have a thickness of 3 μm. Thereafter, a low-density polyethylene resin as a sealant layer 6 was laminated to the resin layer 4 by a melt-extrusion method so as to have a thickness of 30 μm, to thereby manufacture a packaging material to be served to the microwave oven. The sealing strength of the thus obtained packaging material was 18.6 (N/15 mm) at a temperature of 23° C. and 1.7 (N/15 mm) at a temperature of 90° C.

By using this packaging material and the high-speed fully-automatic pillow-packaging machine, Chinese pork dumplings packed in a tray was subjected to the transverse-pillow-packaging operation (bag size: 130 mm×240 mm) to thereby manufacture a pouch of Example 2 to be served to the microwave oven.

Thereafter, the p ouch was frozen, and t he thus obtained pouch containing the frozen pork dumplings was thermally cooked as it is by means of microwave oven. When the pouch was heated to a temperature of about 100° C. and an inner pressure in the pouch was increased by steam, there was caused a small crack at a portion close to the heat sealed portion prided to an inner side of the packaging bag as shown in FIG. 2, then the resin layer 4 was broken at the crack which acts as a starting point of the breakage, causing an air-bleeding. As a result, the steam filling in the packaging bag was discharged thereby to lower the inner pressure.

At this time, although the packaging bag was slightly swollen and there was caused a faint detonation, the pork dumplings as content was not scattered at all. Since the breakage of the resin layer 4 was small so as not to abruptly discharge the steam in the packaging bag, the pork dumplings after being thermally cooked was sufficiently steamed and found to have an excellent condition in good taste.

EXAMPLE 3

As a heat-resistant base layer 2, a biaxially oriented polypropylene film having a thickness of 20 µm was prepared. Onto the heat-resistant base layer 2, a resin (melting point: 83.8° C., EOP-varnish mfd. by Inktech Co. Ltd.) containing polyamide, nitrocellulose and polyethylene-wax was pattern-coated as a resin layer 4 so as to provide a pattern shown in FIG. 3 and have a thickness of 3 µm. Thereafter, a low-density polyethylene resin as a sealant layer 6 was laminated to the resin layer 4 by a melt-extrusion method so as to have a thickness of 30 µm, to thereby manufacture a packaging material to be served to the microwave oven. The sealing strength of the thus obtained packaging material was 8.6 (N/15 mm) at a temperature of 23° C. and 1.8 (N/15 mm) at a temperature of 90° C.

EXAMPLE 4

A pouch of Example 4 was manufactured by using the same packaging material and under the same conditions as in Example 1. In this regard, the pouch of Example 4 to be served to the microwave oven was different from that of Example 1 in only a point that a projecting sealed portion 51 projecting towards inside the packaging bag was formed by heat-sealing work by using a heating jig capable of forming the projecting sealed portion 51 having a shape shown in FIG. 5A.

Thereafter, the pouch was frozen, and the thus obtained pouch containing the frozen pork dumplings was thermally cooked as it is by means of microwave oven. When the pouch was heated to a temperature of about 100° C. and an internal pressure in the pouch was increased by steam, there was caused a small crack at the heat-sealed layer 6 close to a corner portion 55, and the crack was started at the corner portion formed to a top portion of the projecting sealed portion 51 shown in FIG. 5A. Thereafter, the resin layer 4 was broken at the crack which acts as a starting point of the breakage, thus causing an air-bleeding.

As a result, the steam filling in the packaging bag was discharged thereby to lower the inner pressure. At this time, there was caused neither a detonation nor a remarkable swelling of the packaging bag and the pork dumplings as content was not scattered at all. Since the breakage of the resin layer 4 was small so as not to abruptly discharge the steam in the packaging bag, the pork dumplings after being thermally cooked was sufficiently steamed and found to have an excellent condition in good taste.

EXAMPLE 5

A pouch of Example 5 was manufactured by using the same packaging material and under the same conditions as in Example 2. In this regard, the pouch of Example 5 to be served to the microwave oven was different from that of Example 2 in only a point that a projecting sealed portion 52 projecting towards inside the packaging bag was formed by a heat-sealing work by using a heating jig capable of forming the projecting sealed portion 52 having a shape shown in FIG. 6B, thereafter, a hole 61 was formed at the projecting sealed portion 52 by a blanking-work.

Thereafter, the pouch was frozen, and the thus obtained pouch containing the frozen pork dumplings was thermally cooked as it is by means of microwave oven. When the pouch was heated to a temperature of about 100° C. and an inner pressure in the pouch was increased by steam, there was caused a small crack at the heat sealed layer 6 close to the projecting sealed portion 52 shown in FIG. 6B. Subsequently, the resin layer 4 was broken at the projecting sealed portion 52 which acts as a starting point of the breakage, causing an air-bleeding.

As a result, the steam filling in the packaging bag was discharged, whereby it became possible to lower the internal pressure. At this time, there was caused neither a detonation nor a remarkable swelling of the packaging bag, and the pork dumplings as content was not scattered at all. Since the breakage of the resin layer 4 was small so as not to abruptly discharge the steam in the packaging bag, the pork dumplings after being thermally cooked had been sufficiently steamed and found to have an excellent condition in good taste.

EXAMPLE 6

By using the same packaging material as in Example 3 and the high-speed fully-automatic pillow-packaging machine, Chinese pork dumplings packed in a tray was subjected to a transverse-pillow-packaging operation (bag size: 130 mm×240 mm) thereby to manufacture a pouch of Example 6 to be served to the microwave oven. At this time, a projecting seal portion was formed at an inside of the packaging bag by using a heating jig capable of forming a projecting sealed portion having a semicircular-shape shown in FIG. 5B. Thereafter, a half-cut was formed to the projecting sealed portion by laser working method. The half-cut was formed in then X-direction along the sealing direction as shown in FIG. 8.

Thereafter, the pouch was frozen, and the thus obtained pouch containing the frozen pork dumplings was thermally cooked as it is by means of microwave oven. When the pouch was heated to a temperature of about 100° C. and an internal pressure in the pouch was increased by steam, there was caused a small crack at the heat seal layer 6 close to the projecting sealed portion 52 having the semi-circular-shape shown in FIG. 5B. Subsequently, the resin layer 4 was broken at the projecting sealed portion 52 which acts as a starting point of the breakage, thus causing an air-bleeding.

As a result, the steam filling in the packaging bag was discharged to lower the inner pressure. At this time, there was caused neither a detonation nor a remarkable swelling of the packaging bag, and the pork dumplings as content was not scattered at all. Since the breakage of the resin layer 4 was small so as not to abruptly discharge the steam in the packaging bag, the pork dumplings after being thermally cooked had been sufficiently steamed and found to have an excellent condition in good taste.

EXAMPLE 7

As a heat-resistant base layer 2 having a barrier property, an alumina-deposited polyethylene terephthalate film having a thickness of 12 µm was prepared. Onto the heat-resistant base layer 2, ethylene-vinyl acetate copolymer resin (melting point: 66.8° C., WT-PC agent mfd. by Inktech Co. Ltd.) as a resin layer 4 was pattern-coated so as to provide a pattern shown in FIG. 3 and have a thickness of 3 µm. Thereafter, an ethylene-vinyl acetate copolymer resin film as a sealant layer 6 having a thickness of 30 µm was superposed by an extrusion method thereby to manufacture a packaging material for forming a package (small pack) to be served to the microwave oven. The sealing strength of a resin-layer-coated portion of the thus obtained packaging material was 27.2 N/15 mm at a temperature of 25° C. and was 1.3 N/15 mm at a temperature of 90° C.

By using this packaging material, a rectangular-shaped pouch having a size of 70 mm×90 mm was manufactured and 1 g of finely sliced dried-bonito was packed in the pouch to obtain a package (small pack) of Example 7 to be served to the microwave oven.

When the package was heated by the microwave oven having an output power of 1100 W, the pattern-coated portion mentioned above was unsealed to be opened without causing a detonation after 15 seconds had passed from the starting time of the heating operation.

EXAMPLE 8

As a heat-resistant base layer 2 having a barrier property, an alumina-deposited polyethylene terephthalate film having a thickness of 12 µm was prepared. Onto the heat-resistant resin layer 2, a resin (melting point: 83.8° C., EOP-varnish mfd. by Inktech Co. Ltd.) containing polyamide/nitrocellulose group resin was pattern-coated as a resin layer 4 so as to provide a pattern shown in FIG. 3 and have a thickness of 3 µm. Thereafter, a straight chain type and low-density polyethylene film as a sealant layer 6 was superposed onto the resin layer 4 by a dry-laminating method so as to have a thickness of 30 µm, to thereby manufacture a packaging material for forming a package (small pack) to be served to the microwave oven. The sealing strength of the resin-layer-coated portion of the thus obtained packaging material was 19.2 N/15 mm at a temperature of 23° C. and 2.5 N/15 mm at a temperature of 90° C.

By using this packaging material, a rectangular-shaped pouch having a size of 70 mm×90 mm was manufactured and 1 g of finely sliced dried-bonito was packed in the pouch, thereby to obtain a pocket (small pack) of Example 8 to be served to a microwave oven.

When the package was heated by the microwave oven having an output power of 1100 W, the aforementioned pattern-coated portion was unsealed to open without causing a detonation after 15 seconds had passed from the starting time of the heating operation.

(Measuring of the Sealing Strength)

The sealing strengths of the packaging materials obtained in Examples 1 to 8 were measured in accordance with the following manner. That is, at first, the sealant layers 6 were arranged so as to face each other, and a portion of the sealant layer having a predetermined sealing width (for example, 10 mm) was subjected to a thermo-compression-bonding under normal conditions (temperature: 150° C., pressure: 98 kPa, time: 1 second). Subsequently, the packaging material was cut into strips each having a width of 15 mm thereby to prepare two sheets of specimens to be measured. Then, with respect to the measuring specimen, a tensile test was conducted by using a tensile testing machine (TENSILON: universal tensile testing machine mfd. by Orientech Co., Ltd.) so as to peel off the compression-bonded portion of the thus prepared measuring specimen to thereby measure the sealing strength (unit: N/15 mm). In the tensile test, a speed of testing rate of stressing was set to 300 mm/min. In addition, the tensile strength at the respective temperatures was measured in such manner that the measuring specimen was attached to an inside portion of a thermostatic oven then the tensile test was conducted.

What is claimed is:

1. A sealable package to be heated by a microwave oven, at least a portion of said package comprising:
    a heat resistant base layer;
    a sealant layer; and
    a resin layer;
    wherein at least a portion of said resin layer is disposed between said heat resistant base layer and said sealant layer, said resin layer having a softening point in a temperature range of 60 to 90°C. and is selected from the group consisting of ethylene-vinyl acetate copolymer resin, polyamide-nitrocellulose-polyethylene wax resin and resin composition including polyamide-nitrocellulose-polyethylene wax resin.

2. The package according to claim 1, wherein said sealant layer is a single-layered film or multi-layered films selected from the group consisting of low-density polyethylene film, ultra-low-density polyethylene film, straight-chained low-density polyethylene film, intermediate-density polyethylene film, high-density polyethylene film, non-oriented polypropylene film, ethylene-viriyl acetate copolymer film, ethylene acrylic acid copolymer film, ethylene-methacrylic acid copolymer film, ethylene-methylacrylate copolymer film, ethylene-ethylacrylate copolymer film, ethylene-methylmethacrylate copolymer film, and ionomer film.

3. The package according to claim 1, wherein said heat resistant base layer comprises a film selected from the group consisting of oriented polyethylene terephthalate film, silica-deposited polyethylene terephthalate film, alumina-deposited deposited polyethylene terephthalate film, oriented nylon film, silica-deposited oriented nylon film, alumina-deposited oriented nylon film, oriented polypropylene film, polyvinyl alcohol-coated oriented polypropylene film, nylon 6/methaxylenediamine nylon 6 co-extrusion co-oriented film.

4. A packaging bag formed of a packaging material having a predetermined sealed portion, at least a material portion of said bag comprising:
    a sealant layer forming an inside surface of said bag;
    a heat-resistant base layer; and
    a resin layer,
    wherein at least a portion of said resin layer is disposed between said heat-resistant base layer and said sealant layer, said resin layer being composed of a resin material having a softening point in a temperature range of 60 to 90° C. and is selected from the group consisting of ethylene-vinyl acetate copolymer resin, polyamide-nitrocellulose-polyethylene wax resin and resin composition including polyamide-nitrocellulose-polyethylene wax resin, and said resin layer being formed so that said sealed portion has at least a portion which transverses from said inside surface toward an outside surface of the packaging bag.

5. A packaging bag according to claim 4, wherein a pair of the packaging materials are overlapped and heat-sealed so that the sealant layers face each other, a sealing strength of a region formed with the resin layer being more than 7 (N/15 mm) at a temperature less than room temperature and less than 3 (N/15 mm) at a temperature more than 80° C.

6. A packaging material according to claim 4, wherein said sealant layer is a single-layered film or multi-layered films selected from a group consisting of low-density polyethylene film, ultra-low-density polyethylene film, straight-chained low-density polyethylene film, intermediate-density polyethylene film, high-density polyethylene film, non-oriented polypropylene film, ethylene-vinyl acetate copolymer film, ethylene acrylic add copolymer film, ethylene-methacrylic acid copolymer film, ethylene-methylacrylate copolymer film, ethylene-ethylacrylate copolymer film, ethylene-methylmethacrylate copolymer film, and ionomer film.

7. A packaging material according to claim 4, wherein said heat-resistant base layer comprises a film selected from the group consisting of oriented polyethylene terephthalate film, silica-deposited polyethylene terephthalate film, alumina-deposited polyethylene terephthalate film, oriented nylon film, silica-deposited oriented nylon film, alumina-deposited oriented nylon film, oriented polypropylene film, polyvinyl alcohol-coated oriented polypropylene film, nylon 6/methaxylenediamine nylon 6 co-extrusion co-oriented film, and polypropylene/ethylene-vinyl alcohol copolymer co-extrusion co-oriented film.

8. A packaging bag according to claim 4, wherein said transversing portion of the resin layer is formed with an easily openable portion.

9. A packaging bag according to claim 8, wherein said easily openable portion comprises a projecting seal portion formed so as to project inside the packaging bag.

10. A packaging bag according to claim 9, wherein said projecting seal portion is formed with a hole or cutout for shortening a transversing length of the resin layer to a portion of at least the packaging material having the resin layer.

11. A packaging bag according to claim 8, wherein said easily openable portion includes at least one of a cutout, half-cut, score-line and emboss.

12. A container having a container body and a container lid to be applied to the container body, formed of a packaging material and having a predetermined portion to be sealed, at least a material portion of said container comprising:

a sealant layer forming an inside surface of said container when the container lid is applied to the container body;

a heat-resistant base layer; and a resin layer;

wherein at least a portion of said resin layer is disposed between said heat resistant base layer and said sealant layer, said resin layer being composed of a resin material having a softening point in a temperature range of 60 to 90° C. and is selected from the group consisting of ethylene-vinyl acetate copolymer resin, polyamide-nitrocellulose-polyethylene wax resin and resin composition including polyamide-nitrocellulose-polyethylene wax resin, wherein said resin layer is formed so that said sealed portion has at least a portion which transverses from an inside potion towards an outside portion of the container.

13. The package according to claim 1, wherein said resin layer is disposed between said heat resistant base layer and said sealant layer only at the portion to be sealed.

14. A package for heating by a microwave oven, at least a material portion of said package comprising.

a heat resistant base layer;

a sealant layer facing the inside of the package to form a sealed-portion; and a resin layer;

at least a portion of the resin layer being disposed between the heat resistant base layer and the sealant layer, and said resin layer being formed of a resin material having a strength necessary for containing a food or a seasoning at and below room temperature, and having a lowered strength to cause breakage thereof to let an inner pressure be relieved when heated.

15. The package according to claim 14, wherein at least said sealed portion of the package has the resin layer traversing from an inside portion towards an outside portion of the bag or container.

16. The package according to claim 14, wherein said resin layer has a softening point in a range of 60 to 90° C. and is selected from the group consisting of ethylene-vinyl acetate copolymer resin, polyamide-nitrocellulose-polyethylene wax resin and resin composition including polyamide-nitrocellulose-polyethylene wax resin.

17. The package according to claim 14, wherein said material portion is formed as a pair of packaging materials overlapped and heat-sealed so that the sealant layers face each other, a sealing strength of a region formed with the resin layer being more than 7 (N15 mm) at and below room temperature and less than 3 (N/15 mm) at a temperature of and higher than 80° C.

18. The package according to claim 14, wherein said sealant layer is a single-layered film or multi-layered films selected from the group consisting of low-density polyethylene film, ultra-low-density polyethylene film, straight-chained low-density polyethylene film, intermediate-density polyethylene film, high-density polyethylene film, non-oriented polypropylene film, ethylene-vinyl acetate copolymer film, ethylene acrylic acid copolymer film, ethylene-methacrylic acid copolymer film, ethylene-methylacrylate copolymer film, ethylene-methylmethacrylate copolymer film, ethylene-methylmethacrylate copolymer film, and ionomer film.

19. The package according to claim 14, wherein said heat-resistant base layer comprises a film selected from the group consisting of oriented polyethylene terephthalate film, silica-deposited polyethylene terephthalate film, alumina-deposited polyethylene terephthalate film, oriented nylon film, silica-deposited oriented nylon film, alumina-deposited oriented nylon film, oriented polypropylene film, polyvinyl alcohol-coated oriented polypropylene film, nylon 6/methaxylenediamine nylon 6 co-extrusion co-oriented film, and polypropylene/ethylene-vinyl alcohol copolymer co-extrusion co-oriented film.

20. The package according to claim 1, wherein said package is a sealable bag.

21. The package according to claim 1, wherein said package is a container with a sealable lid.

22. The package according to claim 14, wherein said package is a sealable bag.

23. The package according to claim 14, wherein said package is a container with a sealable lid.

24. The package according to claim 23, wherein said material portion is formed said lid.

\* \* \* \* \*